United States Patent [19]

Gergen et al.

[11] 4,400,478

[45] Aug. 23, 1983

[54] MOLDING COMPOUNDS COMPRISING A MIXTURE OF BLOCK COPOLYMERS EMPLOYED AS A MODIFIER FOR THERMOSETTING UNSATURATED POLYESTER RESIN COMPOSITIONS

[75] Inventors: William P. Gergen; Walter M. Halper, both of Houston, Tex.

[73] Assignee: Shell Oil Company, Houston, Tex.

[21] Appl. No.: 452,589

[22] Filed: Dec. 23, 1982

[51] Int. Cl.³ .................. C08K 3/26; C08L 67/06; C08L 53/02; C08L 53/00

[52] U.S. Cl. .................... 523/514; 523/522; 524/426; 524/505; 525/89

[58] Field of Search ............ 523/514, 522; 525/89; 524/426, 505

[56] References Cited

U.S. PATENT DOCUMENTS

| | | | |
|---|---|---|---|
| 3,231,634 | 1/1966 | Wisner et al. | 525/171 |
| 3,674,893 | 7/1972 | Nowack et al. | 525/110 |
| 3,686,365 | 8/1972 | Sequeira | 525/89 |
| 3,882,078 | 5/1975 | Kubota | 523/522 |
| 3,989,769 | 11/1976 | Bonnington | 525/171 |
| 3,992,479 | 11/1976 | Roberts | 525/170 |
| 4,020,036 | 4/1977 | South | 523/514 |
| 4,039,629 | 8/1977 | Himes et al. | 525/89 |
| 4,096,107 | 6/1978 | Roberts et al. | 525/193 |
| 4,119,607 | 10/1978 | Gergen | 523/522 |
| 4,145,381 | 3/1979 | Roberts et al. | 525/193 |
| 4,158,654 | 6/1979 | Moczygemba | 523/514 |
| 4,208,356 | 6/1980 | Fukawa et al. | 525/89 |
| 4,267,283 | 5/1981 | Whitehead | 525/89 |
| 4,329,438 | 5/1982 | Yamori et al. | 525/64 |
| 4,377,647 | 3/1983 | Durbin et al. | 523/522 |

Primary Examiner—Melvyn I. Marquis
Assistant Examiner—Herbert J. Lilling
Attorney, Agent, or Firm—Peter A. Bielinski

[57] ABSTRACT

The invention relates to molding compounds modified with a high 1,2 unsaturated carboxylated styrene-butadiene block polymer and a saturated styrene-alpha-olefin block polymer, said molding compounds containing an unsaturated crosslinkable resin, ethylenically unsaturated monomer, filler, reinforcing agent, catalyst, and thickener.

19 Claims, 3 Drawing Figures

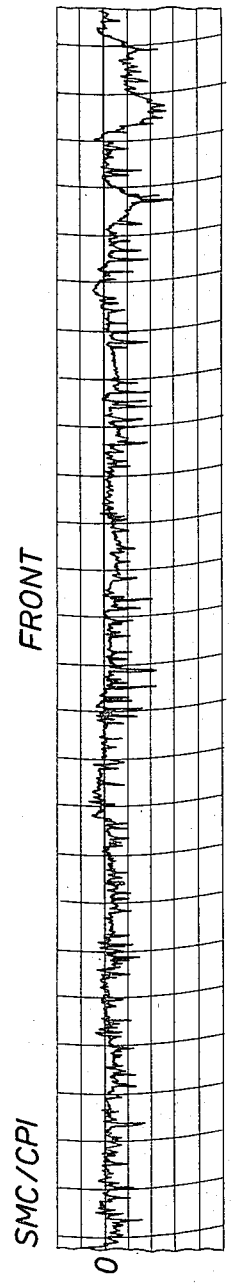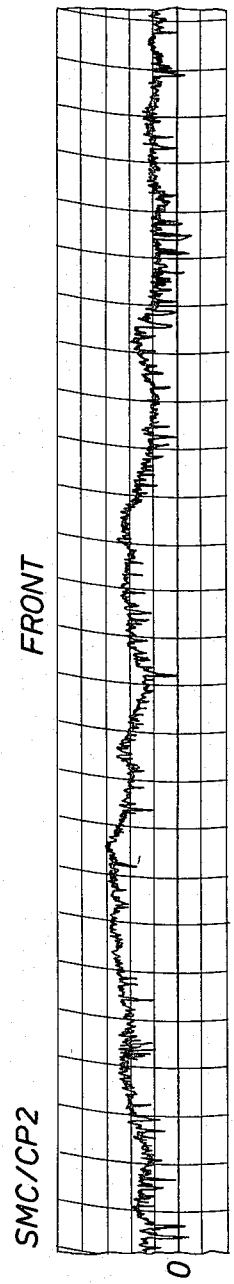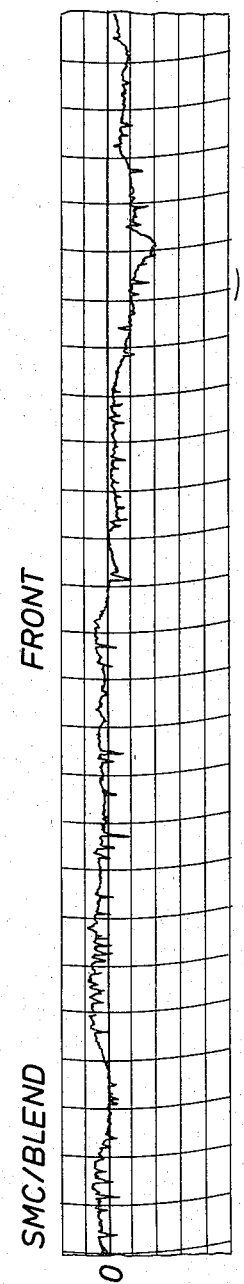

MOLDING COMPOUNDS COMPRISING A MIXTURE OF BLOCK COPOLYMERS EMPLOYED AS A MODIFIER FOR THERMOSETTING UNSATURATED POLYESTER RESIN COMPOSITIONS

BACKGROUND OF THE INVENTION

1. Field of the Invention

The invention relates to a molding compound. More particularly, the invention relates to a molding compound comprising a thermosetting resin, vinyl monomer, filler and a combination of carboxylated unsaturated block copolymers and saturated block copolymers as modifiers.

2. Description of the Prior Art

Unsaturated polyester resins, that is, copolymerizable mixtures of (1) a polyester of an alpha,beta-ethylenically unsaturated dicarboxylic acid, optionally a saturated dicarboxylic acid, and a dihydric alcohol, and (2) an ethylenically unsaturated monomer capable of crosslinking the polyester molecules at the points of unsaturation, are extensively utilized commercially as molding resins. These resins can be utilized in the production of a wide variety of shaped articles such as boats, automobile bodies, heater housings, containers of various types, toys, awnings, business machine bodies, electrical housing and the like. One particular advantage obtained by the use of unsaturated polyester resins in molding operations is the fact that little and sometimes no pressure need be used. Low pressure molding is possible because no condensation by-products that must be removed are formed during the curing of such resins.

The production and use of sheet molding compounds (SMC) and bulk molding compounds (BMC) are well known. Various formulations are disclosed in the following U.S. Pat. Nos.: 3,231,634; 3,674,893; 3,773,709; 3,857,812; 3,882,078; 3,989,769; 3,992,479; 3,998,909; 4,020,036; 4,096,107; and 4,145,381. A typical SMC formulation contains an unsaturated polyester resin, styrene monomer, rubber, peroxide catalyst, surface agent (e.g. zinc stearate), filler (e.g. calcium carbonate), thickening agent (e.g. magnesium oxide), glass fibers and pigments.

U.S. Ser. No. 378,679 disclosed in addition the incorporation of a carboxy-containing block copolymer modifier to improve properties.

There are a number of properties that are necessary for good BMC and SMC materials. They must have high impact, high flexural modulus and strength and smooth surface and gloss. A new SMC/BMC material has now been found that has significantly improved properties especially surface smoothness and gloss.

Thermoplastic polymers are often used as modifiers of SMC/BMC to improve shrinkage and surface distortion. Thermoplastic elastomers (block copolymers) have been found to be superior surface modifiers as well as to give some improvement in ductility or impact strength. Research into the morphology and characteristics of SMC composite cured materials has led to plausible explanations of the mechanism of the block polymer function in these composites. Thus, it is postulated that the block polymer which enters the compound as a homogeneous solution in, for example, styrene monomer phase-separates as a result of thermodynamic forces during polymerization of the styrene monomer, effectively precipitates onto a filler particle and grows in size at that site. Grafting between e.g. the polystyrene phase and the rubber phase occurs as well as intra-phase crosslinking in the rubber phase. These functions are served by $CO_2$ terminated styrene-butadiene (S-B) block polymers having high (40%) 1,2 content as disclosed in U.S. Ser. No. 378,679. In these systems the utilization of the rubber is inefficient because of large phase size and systems with lower equilibrium phase sizes were sought. On the basis of the thermodynamics of phase separation it was decided to modify SMC/BMC with a combination of a saturated di-block copolymer styrene-ethylene/propylene block polymer (S-EP) and the above S-$B_{1,2}$-COOH copolymer. This combination gave superior surface smoothness and gloss compared to the S-$B_{1,2}$-COOH polymer used alone. This was confirmed by SEM surface examination and by micro surface profilometer tests. This combination also tended to minimize shrink and reduce distortion. STEM examination indicated that the S-EP polymer resides in a very finely divided phase separate from the S-$B_{1,2}$-COOH and contributes along with the S-$B_{1,2}$-COOH to the superior properties, superior to either polymer used exclusively in SMC.

SUMMARY OF THE INVENTION

The present invention relates to a new modifier combination and a new fiber-filled polyester composition which may be used as either a bulk molding or sheet molding compound (BMC or SMC). The resulting BMC or SMC has improved properties especially surface smoothness and gloss. In particular, the present invention is, in part, a SMC or BMC modifier which is a combination of (a) between about 10 and 90% w of a normally solid, carboxy-containing polymer comprising the mixture of structures

  (I)

  (II)

  (III)

  (IV)

  (V)

where P- is a styrene-butadiene-block copolymer with the butadiene portion having a microstructure of between about 30 and about 40 mol percent 1,2-vinyl, between about 20 and about 30 mol percent 1,4-cis and between about 30 and about 50 1,4-trans and (b) between 90 and 10% w of a block copolymer having the general formula

wherein A is a blocck selected from the group consisting of polystyrene polymer blocks and hydrogenation products thereof having an average molecular weight between about 5,000 and 50,000, B is a polymer block of the group consisting of alpha olefin polymer, conjugated diene polymers, and hydrogenated conjugated diene polymer wherein at least 50% of the original olefinic double bonds have been reduced by hydrogenation said block having average molecular weight between about 10,000 and 1,000,000 and n is an integer between 1 and 25.

Further, the present invention also contemplates a moldable composition having improved surface appearance and high impact, said composition comprising:
(a) an unsaturated, crosslinkable thermosetting resin;
(b) an ethylenically unsaturated monomer;
(c) an additive selected from the group consisting of reinforcing agents, fillers and mixtures thereof; and
(d) a combination of (a) between 10 and 90% w of a normally solid, corboxy-containing polymer comprising the mixture of structures

  (I)

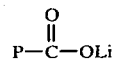  (II)

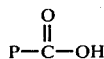  (III)

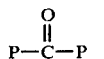  (IV)

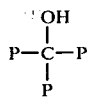  (V)

where P— is a styrene-butadiene-block copolymer with the butadiene portion having a microstructure of between about 30 and about 40 mol percent, 1,2-vinyl, between about 20 and about 30 mol percent 1,4-cis and between about 30 and about 50 1,4-trans and (b) between 90 and 10% w of a block copolymer having the general formula

wherein A is a block selected from the group consisting of polystyrene polymer blocks and hydrogenation product thereof having an average molecular weight between about 5,000 and 50,000, B is a polymer block of the group consisting of alpha olefin polymer, conjugated diene polymers, and hydrogenated conjugated diene polymer wherein at least 50% of the original olefinic double bonds have been reduced by hydrogenation said block having average molecular weight between about 10,000 and 1,000,000 and n is an integer between 1 and 25.

As shown in the illustrative embodiments which follow, it is possible to prepare SMC according to the present invention which has superior surface smoothness and gloss than does, for example, SMC prepared with rubber according to U.S. Pat. No. 4,020,036 or SMC prepared with the carboxy containing polymer alone according to U.S. Ser. No. 378,679.

Detailed Description of the Invention

A key aspect of the present invention is the BMC or SMC modifier combination of solid, carboxylated unsaturated block copolymers and saturated copolymers. The carboxylated copolymers comprise a mixture of structures (I, II, III, IV and V). The weight percentages of structures I, II, III, IV and V in said mixture is about 20 to about 80 percent weight structure I plus II plus III, about 10 to about 40 percent weight structure IV and about 10 to about 40 percent weight structure V. Preferably, the mixture has from about 40 to about 60 percent weight I plus II plus III, about 15 to about 25 percent weight IV and about 25 to about 35 percent weight V.

"P" in the structures is a styrene-butadiene block copolymer (abbreviated "SB" block copolymer). A key aspect of the polymer is the microstructure of the butadiene portion. The microstructure, as determined by an infra-red (IR) method of analysis, is as follows (expressed in mol percent):

|  | Preferred | More Preferred |
| --- | --- | --- |
| 1,2-vinyl | 30 to 40 | 35 |
| 1,4-cis | 20 to 30 | 25 |
| 1,4-trans | 30 to 50 | 40 |

The desired weight average molecular weights of the styrene portion and butadiene portion of each block copolymer arm are:

|  | Preferred | More Preferred |
| --- | --- | --- |
| Styrene block | 8,000 to 20,000 | 11,000 to 15,000 |
| Butadiene block | 30,000 to 100,000 | 60,000 to 80,000 |

The carboxy-containing polymer is typically prepared by anionic polymerization employing an organomonolithium initiator. The first step of the process involves contacting the styrene monomer and the organomonolithium compound (initiator) in the presence of an inert diluent therein forming a living polymer compound having the simplified structure S-Li. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the styrene monomer in step one are represented by the formula RLi; wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyllithium, and the like. The alkyllithium compounds are preferred for employment according to this invention, especially those wherein the alkly group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levers can be used if desired. The required initiator level frequently depends upon the solubility of the initiator in the hydrocarbon diluent. These polymerization reactions are usually carried out at a temperature in the range of $-60°$ to $+300°$ F. and at pressures which are sufficient to maintain the reaction mixture in the liquid phase.

Next, the living polymer in solution is contacted with a butadiene monomer. The resulting living polymer has a simplified structure S—B—Li, or P—Li as used to define the carboxy-containing polymer composition.

The medium vinyl polybutadiene block is readily obtained by employing a small amount of a polar material as a vinyl promotor. The vinyl promotor conveniently is added to the hydrocarbon diluent at the appropriate time in the polymerization sequence. These promotors can be selected from ethers, tertiary amines, and other promoters. Exemplary species include the presently preferred dimethoxybenzene, as well as tetrahydofuron, 1,2-dimethoxyethane, dimethyl ether, diethyl ether, methyl ethyl ether, ethyl propyl ether, di-n-propyl ether, di-n-octyl ether, anisole, dibenzyl ether, diphenyl ether, dimethylethylamine, tri-n-propylamine, tri-n-butylamine, trimethylamine, triethylamine, N,N-dimethylaniline, N-ethylpiperidine, N-methyl-N-ethylaniline, N-methylmorpholine, N,N,N',N'-tetramethylethylenediamine, and the like. The amount of polar compound employed will vary widely with the choice of vinyl promoter, but should be that amount necessary to promote the degree of vinylization desired. An exemplary amount would be in the range of about 0.01 to 25 parts by weight per hundred parts monomer. See generally U.S. Pat. No. 4,308,358.

The microstructure of the polybutadiene block of the block copolymer may be determined by conventional infra-red analysis, using the 910 cm$^{-1}$ band. The average molecular weights of the polystyrene blocks of the block copolymer are determined by gel permeation chromotography, whereas the polystyrene content of the polymer is measured by infra-red spectroscopy of the finished polymer.

After formation of the butadiene block, the living polymer is contacted with carbon dioxide, typically by introducing dry gaseous carbon dioxide in the living polymer solution at a temperature between about 20° C. and about 100° C. and at a pressure between 15 and 115 psia. The amount of $CO_2$ added is important in obtaining the desired mixture of structures. As used herein, the molar ratio of $CO_2$ to P-Li is between about 0.75:1 and about 3.0:1, preferably between about 1.0:1 and about 2.0:1.

Next the polymer is recovered by known finishing techniques.

Saturated diblock copolymers useful in the present invention are referred to as $(A-B)_n$ type in which A represents a block of the group consisting of styrene polymer blocks or hydrogenated products thereof 35,000) which B is limited to average molecular weights between about 10,000 and 1,000,000 (preferably 15,000 and 200,000). Thus typical block copolymers are polystyrene-polyisoprene, polystyrene-polybutadiene, polystyrene-polyethylene, polystyrene-ethylene-propylene copolymer polyvinylcyclohexane-hydrogenated polyisoprene, polyvinylcyclohexane-hydrogenated polybutadiene.

Saturated copolymers useful in the present invention can be those termed di-block, tri-block, radial block, branched or star block copolymers and can be made either by sequential monomer addition or by the coupling of living di-block species of block copolymers.

The conjugated dienes which may be employed in forming the block polymers to be later hydrogenated include especially butadiene and isoprene as well as mixtures thereof. If block copolymers are formed incorporating alpha olefin blocks as the blocks B, the preferred species include ethylene propylene, and butylene, and mixtures thereof.

The blocks A and B may be either homopolymer or copolymer blocks. A typical polymer of this type prior to hydrogenation will have the structure polystyrene SBR.

The block copolymers are hydrogenated to reduce their olefinic unsaturation by at least 50% and preferably at least 80% of the original olefinic double bonds. Hydrogenation is preferably carried out in solution utilizing either homogeneous or heterogeneous catalysts. Preferably, the more readily saturated olefinic double bonds are reduced at relatively mild hydrogenation conditions or by the use of a hydrogenation catalyst selective to the olefinic double bonds.

Catalysts such as cobalts or nickel salts or alkoxides reduced with aluminum alkyl compounds preferably are employed as catalysts. Suitable catalysts include nickel acetate, nickel octoate, or nickel acetyl acetonate reduced with aluminum alkyl compounds such as aliminum triehtyl or aliminum triisobutyl.

U.S. Pat. Nos. 4,036,910 and 3,763,044 disclose styrene-alphaolefin polymers which may be used in the compositions of the present invention and are hereby incorporated by reference.

The unsaturated, crosslinkable thermosetting resins include both unsaturated vinyl ester resins and unsaturated polyester resins. The vinyl ester resins are typically prepared by the esterification of polyepoxides with ethylenically unsaturated monocarboxylic acids in the presence of onium salts of inorganic acids, such as disclosed in U.S. Pat. No. 3,377,406, which is herein incorporated by reference. The vinyl ester resins have a typical formula:

$$\begin{array}{c}R\\ \diagdown\\ C=C-C-O-CH_2-CH-CH_2-O-R_1-O-CH_2-C-CH_2-O-C-C=C\\ \diagup\quad |\ \ |\quad\quad\quad\quad\quad |\quad\quad\quad\quad\quad\quad\quad |\quad\quad\quad |\ \ |\ \diagdown\\ R\ \ \ R\ O\quad\quad\quad\quad\quad OH\quad\quad\quad\quad\quad\quad\quad OH\quad\quad\quad O\ R\ \ R\end{array}$$

while B represents a polymer block of the groups consisting of alpha olefin polymers, conjugated diene polymers, and hydrogenated conjugated diene polymer blocks and n is an integer between 1 and 25. In the latter case at least about 50% of the original olefinic double bonds have been reduced by hydrogenation. The present invention furthermore contemplates the average molecular weight limitations of each of these blocks, block A being limited to average molecular weights between about 5,000 and 50,000 (preferably 9,000 and and are prepared by reacting a glycidyl polyether of a polyhydric phenol with an acrylic acid in the presence of an onium salt.

The composition of the polymerizable unsaturated polyester resin component of the molding compositions of this invention may be varied widely. The polymerizable unsaturated polyester portion thereof is ordinarily prepared by the reaction of an alpha, beta-ethylenically unsaturated dicarboxylic acid, or an admixture of such an acid with a saturated dicarboxylic acid, and a dihydric alcohol. Among the ethylenically unsaturated dicarboxylic acids which may be used are maleic acid, fumaric acid, mesaconic acid, aconitic acid, citraconic acid, ethyl maleic acid, xeronic acid, itaconic acid, and the like. Halogen substituted derivatives of these acids may also be utilized. The anhydrides of these acids, where the anhydrides exist, are, of course, embraced under the term "acid" since the reaction products or polyesters obtained by utilizing such acids and anhydrides are the same, in fact, in many instances it is preferred to utilize the anhydride rather than the free acid.

The dihydric alcohol component of the polyester includes such compounds as ethylene glycol, diethylene glycol, triethylene glycol, polyethylene glycol, 1,3-propanediol, 1,2-propanediol, di-1,3-propanediol, butylene glycol, halogen substituted glycols, and the like. Small amounts of polyols with a functionally greater than two may be utilized in conjunction with the dihydric component.

As indicated hereinabove, in many instances it is desirable to utilize a portion of a saturated dicarboxylic acid in conjuction with the ethylenically unsaturated dicarboxylic acid component. Examples of useful saturated acids include phthalic acid, isophthalic acid, terephthalic acid succinic acid, adipic acid, suberic acid, azelaic acid, sebacic acid, dimethyl succinic acid, as well as halogenated derivatives of the above acids, and the like.

The inclusion of a saturated dicarboxylic acid, such as described hereinabove, in an unsaturated polyester resin does not alter the beneficial effects realized from the addition of a small quantity of the carboxy-containing polymer. Generally, a saturated dicarboxylic acid is included as one of the components utilized in the preparation of an unsaturated polyester resin as some physical properties are improved by such inclusion. The term "unsaturated polyester resin" as used in the resin industry is interpreted as a resin utilizing an unsaturated dicarboxylic acid as at least a portion of acid component of the polyester; therefore, the term embraces those resins which also utilize a saturated dicarboxylic acid as a portion of the acid component.

The cross-linkable polyester resins and vinyl ester resins obtained by the various procedures set forth in the patents listed above can be readily cross-linked by uniting them with ethylenically unsaturated monomers, i.e., monomeric compounds containing a $CH_2=C<$ group. Styrene and vinyl toluene are most frequently utilized as the cross-linking monomer, although many other monomers may also be employed. Styrene is the most preferred monomer. Such other monomers include divinyl benzene, ethyl alpha-methyl styrene, chloro- and fluoro-styrenes, diallyl phthalate, triallyl cyanurate, allyl diglycolate, diallyl phenyl phosphonate, diethylene glycol bis (allyl carbonate), 1,2-propylene gylcol bis (allyl carbonate), bis (allyl lactate) carbonate, allyl succinyl allyl gylcolate, allyl maleate, methallyl maleate, alkyl methacrylates such as methyl methacrylate and ethyl methacrylate, alkyl acrylates such as methyl acrylate, ethyl acrylate, propyl acrylate and butyl acrylate, vinyl acetate, allyl acetate, and the like. In addition to the foregoing going monomeric compounds, which are merely representative, any $CH_2=C<$ group containing monomer or mixtures of such monomers may be utilized if desired.

The catalysts used in this invention are conventional free radical polymerization initiators selected from among organic peroxides and the hydroperoxides such as benzoyl peroxide, dicumyl peroxide, methyl ethyl ketone peroxide, lauryl peroxide, cyclohexanone peroxide, t-buty perbenzoate, t-butyl hydroperoxide, t-butylbenzene hydroperoxide, cumene hydroperoxide, t-butyl peroctoate and the like. In addition, azo compounds such as azobis isobutyronitrile can be employed. A presently preferred catalyst is t-butyl perbenzoate.

The reinforcing agents used in this invention comprise fibers selected from among glass, asbestos, carbon, graphite, metal, synthetic polymers such as polyamides, polyesters, polyolefins and the like and natural fibers such as cotton, jute, hemp, sisal, flax, wood, paper and the like. A presently preferred fiber is glass. The fibers can be used in the form of mats, fabrics, threads, chopped fibers and the like.

Another typical component in SMC and BMC is a thickening agent. These agents are usually oxides or hydroxides of a Group II metal. These agents include specifically oxides and hydroxides of magnesium, calcium, strontium, barium and zinc.

In addition to the previously named components of the compositions of this invention other optional additives can be used. These include fillers, pigments, colorants, lubricants, stabilizers, silane coupling agents and the like. Fillers include calcium carbonate, calcium silicate, talc, clay, alumina hydroxide, antimony trioxide, silica, mica, barium sulfate, calcium sulfate, and the like and mixtures thereof. Presently preferred fillers include calcium carbonate, clay and talc because of availability and cost. Other fillers of interest include surface-treated fillers.

A lubricant such as aluminum, barium, calcium, magnesium or zinc stearate and the like can be used to impart mold release properties to the compositions.

Conventional colorants and pigments such as $TiO_2$, carbon black, phthalocyanine pigments and the like, and mixtures thereof, are empolyed as desired in amounts sufficient to give the desired color to the final molded product.

The ingredients are incorporated by a mixing technique which involves moderate to high shear. This can be accomplished by means of twin-rotor mixers designed to give moderate shear to the paste-like ingredients. It is essential to provide some shear and because of the viscosity of the materials being mixed, proper mixing cannot be obtained simply by stirring or by using a conventional impeller mixer. On the other hand, high intensity mixing which would generate excessive heat (above 35°C.) and activate the catalyst must be avoided also. Sheet molding compounding line mixing equipment can also be used. This mixing under sufficient shear to achieve good dispersion of the ingredients without heat buildup sufficient to activate the catalyst insures a good blend and is necessitated by the fact that the modifier combination is a normally solid material as opposed to a liquid or semi-solid. Shear which gives a heat build-up of 1–50, preferably 2°–30° C. is satisfactory. Low shear is preferred for BMC to avoid glass degredation.

The carboxylated polymer modifier and the saturated copolymer may be blended before incorporation into the molding compound or may be added separately during the mixing.

The curing can be done at a temperature known in the art for the particular catalyst utilized. Generally a temperature of 100° to 200° C. and a time of 1 to 15 minutes in a press is sufficient.

The relative amounts of each component are readily determined and adjusted by one skilled in the art. Relative amounts of various components are expressed below in parts by weight:

|  | Preferred Range | Typical BMC Formulation |
| --- | --- | --- |
| unsaturated thermosetting resin | 30 to 50 | 42 |
| ethylenically unsaturated monomer | 35 to 60 | 46 |
| filler | 100 to 200 | 150 |
| glass fibers | 75 to 150 | 100 |
| carboxylated unsaturated copolymer | 1 to 10 | 6 |
| saturated copolymer | 1 to 10 | 6 |
| thickening agent | 1 to 4 | 2 |
| mold release agent | 2 to 6 | 4 |
| catalyst | 0.5 to 3 | 1 |

The invention is further illustrated by means of the following illustrative embodiments, which are given for the purpose of illustration only and are not meant to limit the invention to the particular reactants and amounts disclosed.

In the formulations, the polyester employed was a propylene glycol-maleate polyester resin. In actual practice, the polyester was combined with 18 parts of the styrene monomer while the rubber blend additive was separately combined with the remaining 28 parts styrene monomer. The various components were mixed under standard conditions.

The unsaturated carboxylated rubber components employed are based on alkyl lithium-prepared styrene-butadiene block copolymers. The polymers are coupled with the degree of coupling shown in Table 1 by reference to the various species - $SB_1$, $SB_2$, $SB_3$, $SB_4$. For example, $SB_2$ signifies a polymer species having the structure SB-x-BS while $SB_3$ signifies a polymer species having the structure

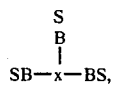

where x is the coupling residue. The polymers were coupled or reacted with $CO_2$.

In the illustrative embodiments sheet molding compounds (SMC) were prepared using two different carboxylated unsaturated copolymers alone CP1 and CP2 as controls and then using a combination of equal parts of CP1 and a saturated diblock copolymer, polystyrene-poly(ethylenepropylene) copolymer (S-EP). A description of these three polymers is given in Table 1.

The two carboxylated rubbers CP1 and CP2 are the 50/50 blend of CP1 and saturated S-EP diblock polymer were employed in identical SMC formulations. The formulations had the following components (expressed in parts by weight):

| SMC Formulation | |
| --- | --- |
| Unsaturated polyester resin solution | 420 |
| Rubber or blend | 126 |
| Styrene monomer | 294 |
| T-butyl perbenzoate | 9 |
| Pigment | 3 |
| Zinc stearate | 39 |
| Calcium carbonate | 1,260 |
| Magnesium oxide | 21 |
| Glass fibers | 840 |
| Total | 3,011 |

Each formulation was prepared according to standard conditions. A portion of the SMC was then compression molded for 2 minutes at 175° C. (peak isotherm) and 1000 psig pressure into flat plaques and the plaques were analyzed according to standard tests. These tests results are presented below in Table 2.

TABLE 2

|  | Tensile, psi | Flex, psi | Flex Mod. psi | Notched Izod ft-lb/in | Unnotched Izod, ft-lb/in |
| --- | --- | --- | --- | --- | --- |
| SMC w. CP1 | 10,417 | 23,512 | $1.44 \times 10^6$ | 14.61 | 20.12 |
| SMC w. CP2 | 11,645 | 23,900 | $1.37 \times 10^6$ | 14.87 | 18.48 |
| SMC w. Blend | 9,634 | 22,750 | $1.40 \times 10^6$ | 16.14 | 21.60 |

The physical properties were determined in accordance with the test procedures as follows:

Flexural modulus and flexural strength, ASTM D790
Tensile, ASTM D256
Molecular Weight, GPC Superior surface smoothness and gloss in the sample plaque made from a composition of the present invention following hot toluene extraction etching was confirmed using a scanning election microscope (SEM). The etched SMC plaque modified with the blend showed a remarkable absence of surface features when compared with etched control plaques of SMC modified with CP1 and CP2 alone.

Additional confirmation of the improved smoothness was obtained with micro surface profilometer scans of the original plaque surfaces which are shown in the drawings. Again, the plaque modified with the blend showed a remarkable improvement in surface smoothness over the control plaques.

Other modifications and variations of the present invention are possible in light of the above teachings. It is, therefore, to be understood that changes may be made in the particular embodiments described above which are within the full intended scope of the invention as defined in the appended claims.

What is claimed is:

TABLE 1

|  | Styrene Block Molecular Weight | Isoprene Block M.W. | S-B Block Molecular Weight Mw (S-EP) | $\frac{Q}{\frac{Mw}{Mn}}$ | Percent Weight Species | | | | Percent 1,2 vinyl of butadiene portion |
| --- | --- | --- | --- | --- | --- | --- | --- | --- | --- |
|  |  |  |  |  | $SB_1$ | $SB_2$ | $SB_3$ | $SB_4$ |  |
| CP1 | 12000 | — | 85000 |  | 44 | 22 | 30 | 4 | 35 |
| CP2 | 13000 | — | 85000 |  | 59 | 21 | 17 | 3 | 14 |
| Saturated Polymer |  |  |  |  |  |  |  |  |  |
| S-EP diblock | 37000 | 65000 | (100,000) | 1.2 | (99% hydrogenated) | | | | — |

1. A molding compound modifier combination comprising (a) between about 10 and 90% w of a normally solid, carboxy-containing polymer comprising the mixture of structures $$P-H \qquad (I)$$

$$P-\overset{\overset{O}{\|}}{C}-OLi \qquad (II)$$

$$P-\overset{\overset{O}{\|}}{C}-OH \qquad (III)$$

$$P-\overset{\overset{O}{\|}}{C}-P \qquad (IV)$$

$$P-\overset{OH}{\underset{P}{C}}-P \qquad (V)$$

where P— is a styrene-butadiene block copolymer with the butadiene portion having a microstructure of between about 30 and about 40 mol percent 1,2-vinyl, between about 20 and about 30 mol percent 1,4-cis and between about 30 and about 50 mol percent 1,4-trans and (b) between 90 and 10% w of a block copolymer having the general formula $$(A-B)_n$$

wherein A is a block of the group consisting of polystyrene polymer blocks and hydrogenation products thereof having an average molecular weight between about 5,000 and 50,000, B is a polymer block of the group consisting of alpha olefin polymer, conjugated diene polymers, and hydrogenated conjugated diene polymer wherein at least 50% of the original olefinic double bonds have been reduced by hydrogenation said block having average molecular weight between about 10,000 and 1,000,000 and n is an integer between 1 and 25.

2. The modifier combination of claim 1 wherein the weight percentages of structures I, II, III, IV and V in said mixture is about 20 to about 80 percent weight structure I plus II plus III about 10 to about 40 percent weight structure IV and about 10 to about 40 percent weight structure V.

3. The modifier combination of claim 2 wherein the weight average molecular weight of each styrene block in said styrene-butadiene block copolymer is between about 8,000 and about 20,000 and the weight average molecular weight of each butadiene block in said block copolymer is between about 30,000 and about 100,000.

4. The modifier combination of claim 1 wherein the saturated block copolymer comprises isoprene and styrene blocks wherein at least 85% of the original olefinic double bonds have been reduced by hydrogenation.

5. The modifier combination of claim 1 wherein the saturated block copolymer comprises isoprene blocks with molecular weights of between 30,000 and 50,000 and styrene blocks with molecular weights of between 50,000 and 80,000 wherein at least 95% of the olefinic double bonds have been reduced by hydrogenation.

6. The modifier combination of claim 1 wherein at least 99% of the olefinic double bonds have been reduced by hydrogenation.

7. A moldable composition having improved surface smoothness and gloss comprising:
(a) an unsaturated, crosslinkable thermosetting resin;
(b) an ethylenically unsaturated monomer;
(c) an additive selected from the group consisting of reinforcing agents, fillers and mixtures thereof; and
(d) a combination of modifiers comprising (a) between about 10 and about 90% w of a normally solid, carboxy-containing polymer comprising the mixture of structures $$P-H \qquad (I)$$

$$P-\overset{\overset{O}{\|}}{C}-OLi \qquad (II)$$

$$P-\overset{\overset{O}{\|}}{C}-OH \qquad (III)$$

$$P-\overset{\overset{O}{\|}}{C}-P \qquad (IV)$$

$$P-\overset{OH}{\underset{P}{C}}-P \qquad (V)$$

where P— is a styrene-butadiene block copolymer with the butadiene portion having a microstructure of between about 30 and about 40 mol percent 1,2-vinyl, between about 20 and about 30 mol percent 1,4-cis and between about 30 and about 50 mol percent 1,4-trans and (b) between about 90 and about 10% w of a block copolymer having the general formula $$(A-B)_n$$

wherein A is a block of the group consisting of polystyrene polymer blocks and hydrogenation products thereof having an average molecular weight between about 5,000 and 50,000, B is a polymer block of the group consisting of alpha olefin polymer, conjugated diene polymers, and hydrogenated conjugated diene polymer wherein at least 50% of the original olefinic double bonds have been reduced by hydrogenation said block having average molecular weight between about 10,000 and 1,000,000 and n is an integer between 1 and 25.

8. The composition of claim 7 wherein the weight percentages of structures, I, II, III, IV and V in said mixture is about 20 to about 80 percent weight structure I plus II plus III, about 10 to about 40 percent weight structure IV and about 10 to about 40 percent weight structure V.

9. The composition of claim 7 wherein said thermosetting resin is a polyester resin.

10. The composition of claim 9 wherein said polyester resin is prepared by reacting an unsaturated dicarboxylic acid and a polyol.

11. The composition of claim 7 or claim 3 wherein said unsaturated monomer is styrene.

12. The composition of claim 7 wherein said additive is calcium carbonate.

13. The composition of claim 7 wherein said additive is a mixture of calcium carbonate and chopped fiber glass.

14. The composition of claim 7 also containing a catalyst.

15. The composition of claim 14 wherein said catalyst is an organic peroxide.

16. The composition of claim 7 wherein the weight average molecular weight of each styrene block in said block copolymer is between about 8,000 and about 20,000 and the weight average molecular weight of each butadiene block in said block copolymer is between about 30,000 and about 100,000.

17. The composition of claim 7 wherein the saturated block copolymer comprises isoprene and styrene blocks wherein at least 85% of the original olefinic double bonds have been selectively reduced by hydrogenation.

18. The composition of claim 7 where the saturated block copolymer comprises isoprene blocks with molecular weights of between 30,000 and 50,000 and styrene blocks with molecular weights of between 50,000 and 80,000 wherein at least 95% of the olefinic double bonds have been reduced by hydrogenation.

19. A cured article produced by subjecting the composition of claim 14 to heat.

* * * * *